(12) United States Patent
Sharma et al.

(10) Patent No.: US 10,895,764 B1
(45) Date of Patent: Jan. 19, 2021

(54) DIELECTRIC ELECTRO-OPTIC PHASE SHIFTER

(71) Applicant: VEO, INC., San Diego, CA (US)

(72) Inventors: Rajat Sharma, San Diego, CA (US); Chen-Kuo Sun, Escondido, CA (US); Robert B. Welstand, San Diego, CA (US)

(73) Assignee: VEO, INC., San Diego, CA (US)

( * ) Notice: Subject to any disclaimer, the term of this patent is extended or adjusted under 35 U.S.C. 154(b) by 0 days.

(21) Appl. No.: 16/663,110

(22) Filed: Oct. 24, 2019

(51) Int. Cl.
*G02F 1/025* (2006.01)
*G02F 1/035* (2006.01)

(52) U.S. Cl.
CPC .............. *G02F 1/025* (2013.01); *G02F 1/035* (2013.01); *G02F 2203/20* (2013.01); *G02F 2203/50* (2013.01)

(58) Field of Classification Search
CPC .................................................. G02F 1/01708
See application file for complete search history.

(56) References Cited

U.S. PATENT DOCUMENTS

| 4,008,947 | A | 2/1977 | Baues | |
| 4,525,687 | A | 6/1985 | Chemla | |
| 4,840,446 | A | 6/1989 | Nakamura | |
| 5,917,980 | A | 6/1999 | Yoshimura | |
| 6,310,999 | B1 | 10/2001 | Marcuse | |
| 7,672,553 | B2 * | 3/2010 | Gill | G02F 1/025 385/2 |
| 7,860,358 | B2 | 12/2010 | Tsuda | |
| 9,046,704 | B2 | 6/2015 | Costache | |
| 2003/0231394 | A1 | 12/2003 | Kimura | |
| 2004/0247236 | A1 | 12/2004 | Yoshimura | |
| 2005/0254752 | A1 | 11/2005 | Domash | |
| 2009/0263078 | A1 | 10/2009 | Hosomi | |
| 2013/0034323 | A1 | 2/2013 | Costache | |
| 2016/0202502 | A1 * | 7/2016 | Heideman | G02B 6/14 385/3 |

\* cited by examiner

*Primary Examiner* — Michelle R Connelly
(74) *Attorney, Agent, or Firm* — Nydegger & Associates

(57) ABSTRACT

An EO phase shifter for modulating an electrical signal onto an optical wave is manufactured using CMOS process tools whereby a waveguide core made of EO material has intimate contacts with its electrodes. Specifically, the waveguide core is made of a Silicon-Rich Silicon Nitride (SRN) material which has a high linear refractive index n and a high third order nonlinear susceptibility. The electrodes are made of P or N doped silicon. Also, polarization of the optical wave is oriented normal to interfaces between the waveguide core and the electrodes. With this combination, the EO phase shifter exhibits high optical confinement, low propagation loss, and a high electro-optic overlap integral for modulation.

17 Claims, 4 Drawing Sheets

DIELECTRIC ELECTRO-OPTIC PHASE SHIFTER

FIELD OF THE INVENTION

The present invention pertains generally to electro-optic (EO) phase shifters for modulating an optical wave with an electrical signal. In particular, the present invention pertains to electro-optic phase shifters that can be fabricated using standard tooling used in Complementary Metal-Oxide Silicon (CMOS) manufacturing process flows. The present invention is particularly, but not exclusively, useful as an EO phase shifter having a Silicon-Rich Silicon Nitride (SRN) waveguide core that establishes a high overlap integral between the applied electric field E and the optical wave for modulation of the optical wave.

BACKGROUND OF THE INVENTION

Electro-optic phase-shifters are known in the prior art. Essentially, they involve using an electrical signal to modulate the phase of a propagating optical wave. This is done via means of modulating the refractive index of the medium which induces a change in phase of the optical wave.

In the field of integrated optics, and specifically silicon photonics, this modulation is most commonly achieved by a change in free carrier density (namely electrons and holes) in the waveguide, via the plasma dispersion effect. Until recently, most commercial realizations of silicon electro-optical modulators relied on plasma dispersion phase-shifters. Heretofore, the highest speed variants of these phase-shifters have been based on integrating PN diodes or Semiconductor-insulator-Semiconductor (SIS) capacitors in a silicon waveguide. These variants suffer from drawbacks including, but not limited to, high optical losses, high-power consumption, and limited bandwidth because of large device capacitances.

As such, there is an acute need for realizing electro-optic phase-shifters using ultrafast effects, such an the Pockels effect which relies on the second order nonlinear susceptibility $\chi^{(2)}$ of the material or the quadratic electro-optic effect which relies on the third order nonlinear susceptibility $\chi^{(3)}$ of the material.

It is known, however, that silicon and the dielectrics available in the CMOS process do not have any second order susceptibility $\chi^{(2)}$. Ergo, the Pockels effect is impractical. As a consequence, the quadratic electro-optic effect becomes of greater interest.

It should be noted that both the Pockels and quadratic electro-optic effects are commonly associated with highly nonlinear materials such a Lithium niobate, Lead lanthanum zirconium titanate (PLZT), Barium titanate (BTO) or polymers. Integration of such materials into silicon photonics platforms has the fundamental drawback of relying on materials and tooling not available within industry standard CMOS process flows. Additionally, such approaches rely on waveguide structures or configurations that suffer from poor confinement of the optical field in the electro-optic (EO) material, leading to inefficient devices.

There have also been attempts at engineering a non-zero second-order nonlinear susceptibility $\chi^{(2)}$ in silicon (a material with no inherent $\chi^{(2)}$) via strain-engineering using stressor silicon nitride layers. However, this approach suffers from an overall low realizable nonlinear coefficient and hence devices which are impractical.

Finally, there has also been a demonstration wherein phase modulation in silicon was achieved via the quadratic electro-optic effect using an integrated p-i-n diode. This approach relied on the electric field induced in the diode upon application of a reverse bias, to modulate the index of silicon using its third-order nonlinear susceptibility $\chi^{(3)}$. While compatible with CMOS processes, this approach suffers from relatively low electric breakdown strength $(E_{BD})\sim4\times10^7$ V/m and low $\chi^{(3)}\sim2\times10^{-19}$ m$^2$/V$^2$ of silicon. Additionally, because of the low index mismatch among intrinsic, p- and n-doped silicon, the phase-shifter requires a wide intrinsic region in order to avoid high optical losses. This, in turn, reduces the strength of the electric field in the intrinsic region, which further causes a degradation in the phase-shifting efficiency of the device.

With the above in mind, it is an object of the present invention to provide an EO phase shifter with a highly nonlinear waveguide core that exhibits a high confinement factor for an optical wave, and that achieves a high overlap integral between the optical wave being modulated and an applied electric field. Another object of the present invention is to provide an EO phase shifter with a waveguide core that simultaneously exhibits low linear material absorption and a relatively high linear refractive index. Still another object of the present invention is to provide a method for manufacturing an EO phase shifter whereby electrodes can be fabricated in direct intimate contact with the waveguide core using tooling available in CMOS process flows. Another objective of the present invention is to provide an EO phase shifter that is easy to use, is relatively simple to manufacture, and is comparatively cost effective.

SUMMARY OF THE INVENTION

Structurally, the electro-optic (EO) phase shifter comprises a waveguide core, and a pair of electrodes that are fabricated in direct intimate contact with the waveguide core. The waveguide core and the electrodes, however, are made of different materials. Specifically, Silicon-Rich Silicon Nitride (SRN), an insulating, silicon rich variant of silicon nitride, is used for the waveguide core and acts as the EO material and doped silicon is used for the electrodes.

In the present invention, both intrinsic and extrinsic parameters are used to optimize the device's phase-shifting performance. Here, the intrinsic parameters refer to the material properties of both the waveguide core and the electrodes, such as their index of refraction (n), relative dielectric permittivity $\varepsilon_r$, third order susceptibility $\chi^{(3)}$, electric breakdown strength $E_{BD}$, and doping (N). The extrinsic parameters, on the other hand, refer to the physical dimensions width W and thickness H of the waveguide core, the thicknesses $h_1$ and $h_2$ of the top and bottom electrodes, respectively, and the phase shifter length L. For the present invention the modulation of the refractive index n is achieved by the quadratic electro-optic effect:

$$\Delta n = 3\frac{\chi^{(3)}E^2}{2n}D$$

where $\Delta n$ is the change in the SRN refractive index under the influence of an externally applied electric field E, and D is the degeneracy factor. As envisioned for the present invention, the electric field E can be time varying or static.

For the present invention, a set of optimizations involving intrinsic and extrinsic properties of both the SRN core and the silicon electrodes is provided. This is done in order to achieve low $V_\pi L_\pi$, high bandwidth of operation, and low power consumption, where $V_\pi$ and $L_\pi$ refer to the voltage and length required to induce a π phase shift. In accordance with the present invention, there are essentially five requirements for an EO phase shifter. These requirements are: i) high optical confinement; ii) high overlap integral; iii) low relative permittivity, $\varepsilon_r$; iv) high EO coefficient; and v) high electric breakdown strength.

The first requirement is a high degree of confinement of the optical mode in the EO material. As envisioned for the present invention the optical wave is preferably guided in its fundamental mode. Specifically, for the present invention, the electrodes are made of a P or N doped silicon having a higher index of refraction than that of the SRN core. The surrounding dielectrics will also have a much lower index of refraction. Optimally, the SRN core index of refraction is kept between 2.5 and 3.5 for an operational wavelength λ for the optical wave in a range between 800 and 1,600 nm, to allow for a high degree of confinement. The purpose of this refractive index mismatch is to guide a suitably polarized optical mode into the lower index SRN. Finally, the width W and thickness H of the waveguide core need to be dimensionally selected to further optimize confinement. High confinement minimizes optical loss from interaction of the optical mode with free carriers in the silicon electrodes.

Secondly, it is essential to ensure a high degree of overlap of the optical field with the applied electric field E. Specifically for the present invention, the SRN core is fabricated in intimate contact with the doped silicon electrodes. This ensures maximum electrical field strength for a given applied voltage bias across the two electrodes. It is to be appreciated that, alternatively, the electrodes can be made of metals or transparent conductive oxides. The present invention, however, appreciates that fabrication may require a thin barrier material to be placed between the electrodes and the SRN core.

Thirdly, the SRN core is fabricated to possess a low relative permittivity, $\varepsilon_r$<10. This ensures a low device capacitance, a high bandwidth of operation, and low energy consumption during device operation.

Fourthly, the material of the waveguide core needs to possess a high EO coefficient. In the case of the present invention, the SRN core is fabricated to possess a third order susceptibility $\chi^{(3)} \sim 9 \times 10^{-9}$ m²/V² within the operational wavelength range for the optical wave. It is a known property of the SRN thin films that their nonlinear susceptibility increases with an increasing linear refractive index. Thus, a refractive index, preferably n>3, is selected during deposition to ensure that the SRN film has a high nonlinear coefficient.

Fifthly, in order to get a large change in refractive index, a high electric field is essential. In the case of the present invention, the SRN core is fabricated to have a high electric breakdown strength, $E_{BD}$>1×10⁸ V/m, with minimal defect density for the thickness H. This is needed to ensure low scattering optical loss and to sustain the high electric field without reliability degradation.

For a fabricated EO phase shifter of the present invention, the polarization of the optical mode is aligned orthogonal to both the direction of propagation, and the interface between the SRN core and the silicon electrodes, in order to use the highest component of $\chi^{(3)}$. As envisioned for the present invention, depending on input polarization, manufacture of the EO phase shifter may require either a horizontal embodiment or vertical embodiment. In an alternate embodiment, the device can be made to be polarization insensitive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
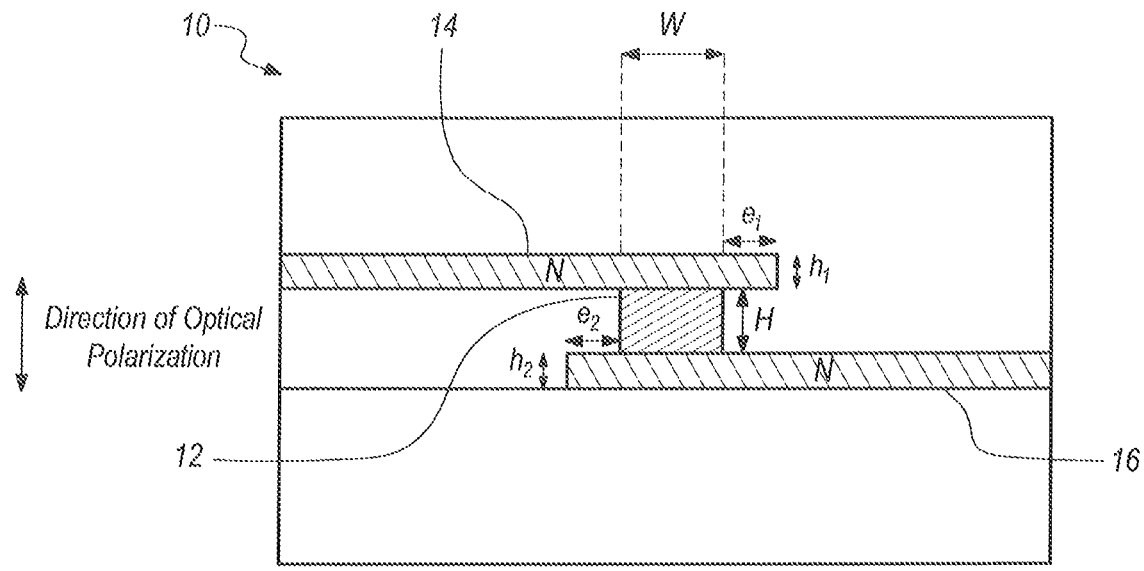
FIG. 1 is an elevation view of an inside cross section of a vertical electro-optic (EO) phase shifter, showing components for the present invention in an arrangement as would be seen in a plane perpendicular to the direction of travel for an optical wave in the waveguide core of the EO phase shifter.

Referring initially to FIG. 1, a vertical electro-optic (EO) phase shifter in accordance with the present invention is shown and is generally designated 10. As shown the vertical EO phase shifter 10 includes a waveguide core 12 which is directly connected in intimate contact with a first electrode 14 and a second electrode 16. For the present invention, the waveguide core 12 is made of a Silicon-Rich Silicon Nitride (SRN), while both the first electrode 14 and the second electrode 16 are made of a doped silicon. For purposes of the present invention the first electrode 14 and the second electrode 16 can be either P doped or N doped silicon.

In detail, the waveguide core 12 is manufactured in a multi-step process involving a silicon-rich silicon nitride ($Si_xN_y$) film that is deposited by well known Chemical Vapor Deposition (CVD) techniques. These techniques allow for the deposition of a non-stoichiometric silicon nitride film which is silicon rich. In this manner, the resulting SRN, which is used as the waveguide core 12, can have intrinsic characteristics that differ from stoichiometric Nitride; namely, its refractive index n, its relative dielectric permittivity $\varepsilon_r$, its nonlinear susceptibilities ($\chi^{(2)}$ and $\chi^{(3)}$), its electric breakdown strength $E_{BD}$, and linear material absorption. As envisioned for the present invention, n will be increased from around 2 for $Si_3N_4$, into a range between 2.5-3.5. It will also happen that the relative permittivity $\varepsilon_r$ of the waveguide core 12 can be held to a value less than 10.

In FIG. 1 the waveguide core 12 is shown to have a thickness H and a width W. It will also be seen that the first electrode 14 has a thickness $h_1$ and an extension overlap $\pm e_1$. Similarly, the second electrode 16 has a thickness $h_2$ and an extension overlap $\pm e_2$. Values for the dimensions H, W, $h_1$, $h_2$, $e_1$, and $e_2$ can be varied according to design considerations. Preferably, $e_1 = e_2 = 0$.

Figure 2A:
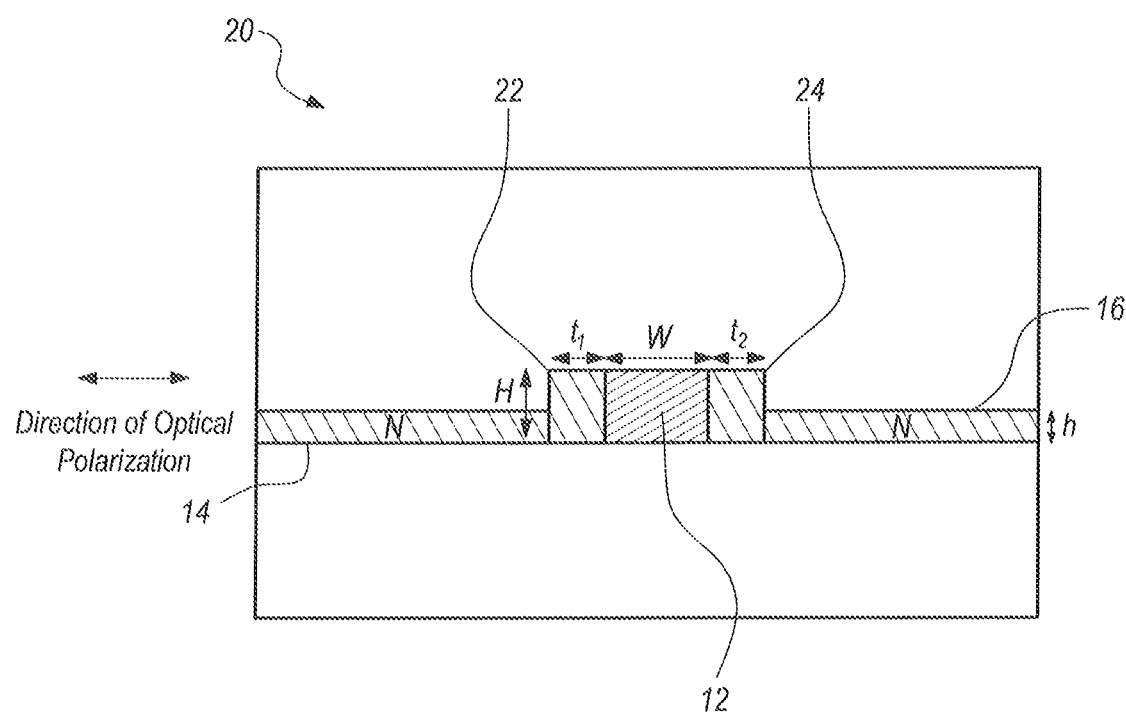
FIG. 2A is an elevation view of an inside cross section of a horizontal EO phase shifter, showing components for the present invention in an arrangement as would be seen in a plane perpendicular to the direction of travel for an optical wave in the waveguide core of the EO phase shifter.

Referring to FIG. 2A, a horizontal EO phase shifter in accordance with the present invention is shown and is generally designated 20. Insofar as construction materials are concerned, the vertical EO phase shifter 10 and the horizontal EO phase shifter 20 are essentially the same. Importantly, they both have a same waveguide core 12 that is manufactured with a same SRN material having the same intrinsic characteristics. Depending on the desired polarization of the input optical mode, however, one configuration for the EO phase shifter (i.e. vertical v. horizontal) may be preferable over the other. For example, the transverse magnetic (TM) polarization could be used for the case of the vertical EO phase shifter 10. Depending on this preference, the cooperation of structure for the different configurations may be altered, albeit only slightly.

In FIG. 2A, the horizontal EO phase shifter 20 is shown with a waveguide core 12 having a thickness H and a width W. It will also be seen that the first electrode 14 and the second electrode 16 have a same thickness of $h_1 = h_2 = h$. The horizontal EO phase shifter 20 also includes a first side section 22 having a thickness H and a width $t_1$. As shown, the first side section 22 is positioned between the first electrode 14 and the waveguide core 12. Importantly, the thickness H of first side section 22 is equal to that of the waveguide core 12. Further, the first side section 22 will be made of the same silicon doped material as that of the first electrode 14. Thus, via the first side section 22, the first electrode 14 is connected in direct electrical contact with the waveguide core 12. A second side section 24, which is similar to the first side section 22, interconnects the second electrode 16 with the waveguide core 12.

Figure 2B:
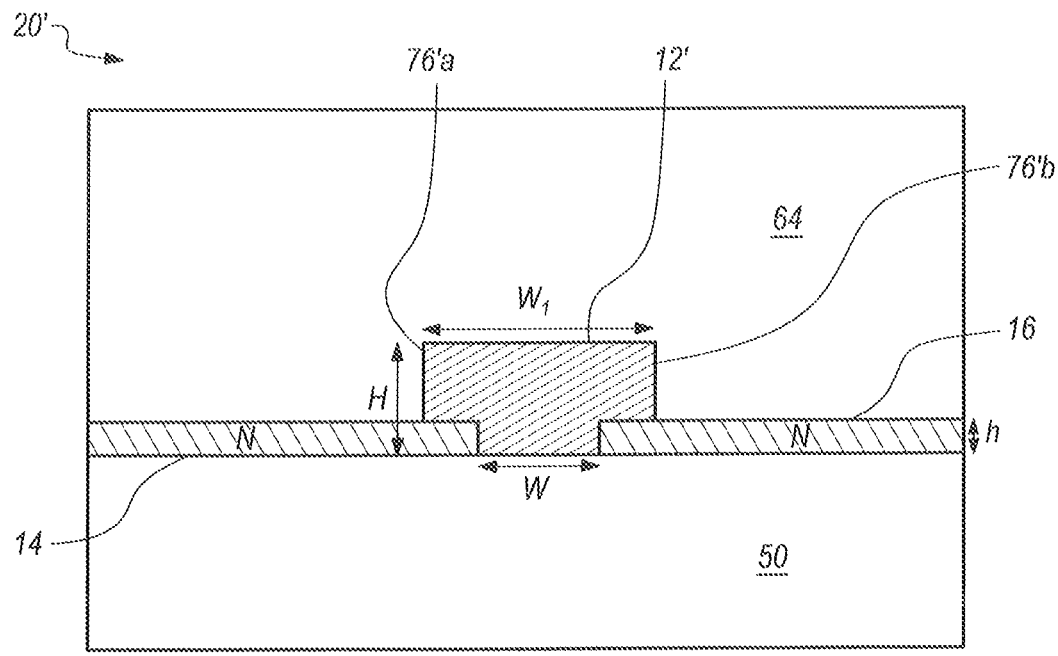
FIG. 2B is an elevation view of a first alternate embodiment of a horizontal EO phase shifter as seen from the same perspective as shown in FIG. 2A.
Figure 2C:
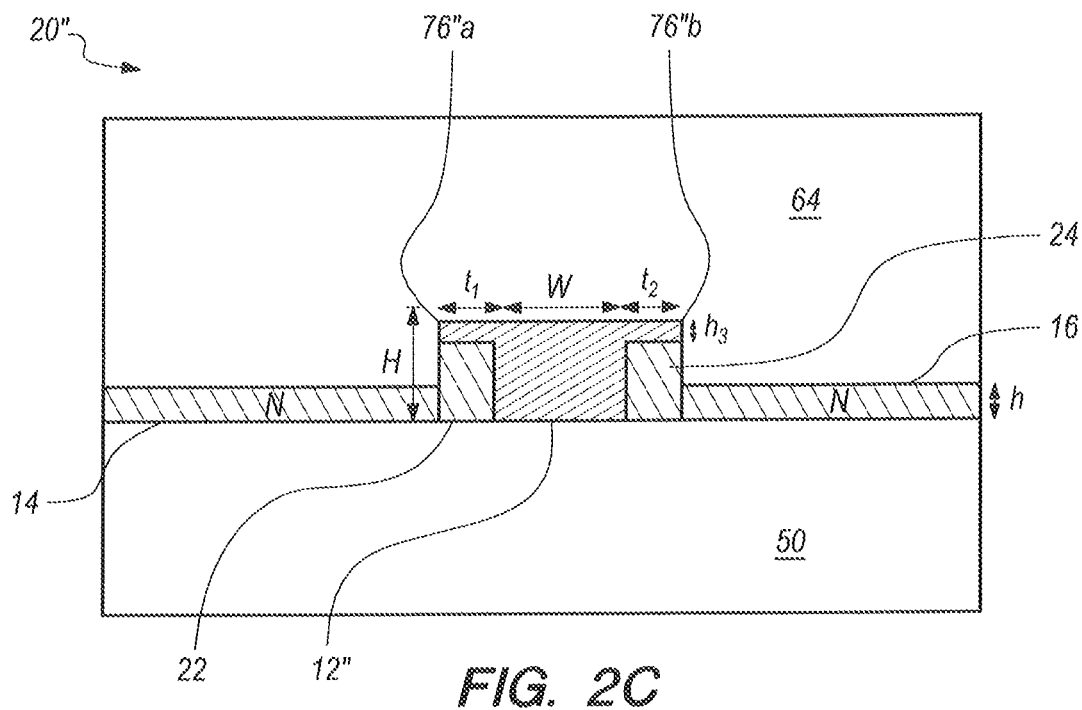
FIG. 2C is an elevation view of a second alternate embodiment of a horizontal EO phase shifter as seen from a same perspective as shown in FIG. 2A.

FIGS. 2B and 2C respectively show a first alternate embodiment for a horizontal EO phase shifter, generally designated 20', and a second alternate embodiment for a horizontal EO phase shifter, generally designated 20", for the present invention. In overview, the phase shifter 20' shown in FIG. 2B has a waveguide core 12' which includes an overlap 76'$a$ that extends over the first electrode 14. This phase shifter 20' also includes an overlap 76'$b$ that extends over the second electrode 16.

In contrast with the first alternate embodiment, i.e. phase shifter 20' (FIG. 2B), the second alternate embodiment, i.e. phase shifter 20" (FIG. 2C), includes a first side section 22 as part of the first electrode 14, and a second side section 24 as part of the second electrode 16. For the phase shifter 20", the overlaps 76"$a$ and 76"$b$ respectively extend over the first side section 22 and the second side section 24.

In detail, with reference to FIG. 2B, the waveguide core 12' of phase shifter 20' will have a thickness H that extends beyond the thickness h of the first and second electrodes 14/16. The waveguide core 12' will include a lower portion having a width W that extends between the first electrode 14 and the second electrode 16. The waveguide core 12' also includes an upper portion that extends over the respective electrodes 14 and 16, beyond the width W.

Thus, an upper width $W_1$ is established for the waveguide core 12'. As shown, $W_1$ will equal W plus the additional width provided by the overlaps 76'$a$ and 76'$b$.

With reference to FIG. 2C, it will be seen that the thickness H of the waveguide core 12" includes the thickness of the individual first and second side sections 22 and 24. It also includes the thickness $h_3$ of the individual overlaps 76"$a$ and 76"$b$. Also, it is seen that the waveguide core 12" has a width W between the first and second side sections 22 and 24, and that above the first and second side sections 22 and 24 the waveguide core 12" has a width equal to $W + t_1 + t_2$. In this embodiment, the additional width $t_1 + t_2$ is provided by the first and second side sections 22 and 24.

Figure 3:
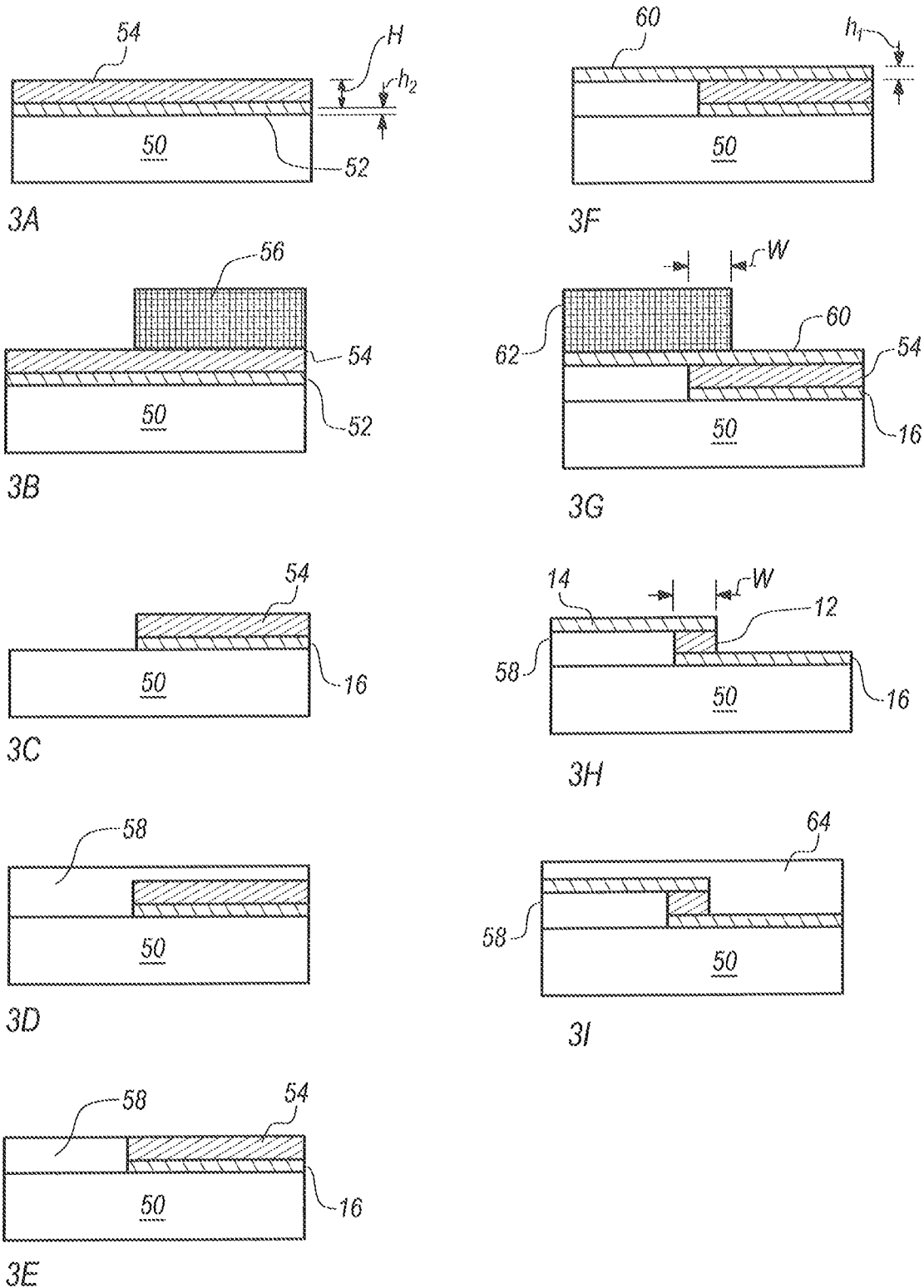
FIG. 3 is a sequence of steps 3A-1 to be followed for the manufacture of the vertical EO phase shifter shown in FIG. 1.

The process steps for manufacturing a vertical EO phase shifter 10 such as the one shown in FIG. 1, are set forth in FIG. 3. In general, these manufacturing steps comply with standard silicon fabrication process flows.

In FIG. 3, Step 3A shows that to begin in the manufacture of a vertical EO phase shifter 10 a bottom cladding 50 is presented which is covered with a lower layer 52 that, in turn, is covered with a Silicon-Rich Silicon Nitride (SRN) film 54. The bottom cladding 50 will sit on top of a substrate, not shown, which may be silicon. Preferably the bottom cladding 50 is made of $SiO_2$ having a low index of refraction, and the lower layer 52 is made of a Crystalline, Polycrystalline, or Amorphous silicon.

As envisioned for the present invention, the silicon material can be made using any well known fabrication process, to include: depositing, growing or bonding techniques. Further, it is envisioned that the silicon of the lower layer 52 will be either an N or P doped silicon. Most importantly, the SRN film 54 is to be manufactured with specific intrinsic characteristics that possess: i) a relatively high refractive index (e.g. in a range 2.5 to 3.5); ii) a low permittivity $\varepsilon_r$; iii) a high EO coefficient for increased $\chi^{(3)}$ susceptibility; iv) a high electric breakdown strength $E_{BD}$; and v) a low linear material absorption. Dimensionally, the lower layer 52 of doped silicon will have a thickness $h_2$ that is preferably less than the thickness H of the SRN film 54.

Step 3B indicates that an etching mask 56 (defined by E-beam, Photo resist, or dielectric hard mask) is positioned on top of the SRN film 54 substantially as shown. Unmasked portions of the SRN film 54 and the doped silicon lower layer 52 are then removed using well known etching techniques to expose a portion of bottom cladding 50. The result of this etching is the creation of the second electrode 16 as shown in Step 3C.

Step 3D indicates that a middle cladding 58 is deposited over the remaining SRN film 54 and the exposed bottom cladding 50 that is shown remaining from Step 3C. Like the bottom cladding 50 mentioned above, the middle cladding 58 is preferably made of $SiO_2$ having a low index of refraction. However, low-K dielectric materials with a lower index of refraction than $SiO_2$ and a lower optical loss can alternatively be used for all cladding layers. As shown in Step 3E, the unmasked middle cladding 58 is then thinned and planarized to a level that exposes the SRN film 54, while minimizing the removal of any SRN film, resulting in the middle cladding 58 becoming coplanar with the SRN film 54. In this case, the result is a combination of fabricating material as shown in Step 3E.

In step 3F, an upper layer 60 of doped silicon is laid down over the combination of fabricating material shown in Step 3E. This upper layer 60 of doped silicon will have a thickness $h_1$ that may, or may not, equal the thickness $h_2$ of the second electrode 16. Next, an etching mask 62 is positioned on the upper layer 60 of doped silicon, as shown in Step 3G. Importantly, the etching mask 62 overlaps both the SRN film 54 and the second electrode 16 of doped silicon through a width W. The subsequent etching operation goes through the layer 60 and film 54 to leave a combination of structural components that, together, form the waveguide core 12 and the first electrode 14 of the vertical EO phase shifter 10.

As shown in Step 3H, at this stage in the fabrication (manufacture) of the EO phase shifter 10, it can be seen that the first electrode 14, the second electrode 16, and the waveguide core 12, have been directly and intimately connected with each other. The last step, Step 3I, then indicates that a top cladding 64 is deposited to embed the vertical EO phase shifter 10 within a cladding material similar to that of cladding 58 and 50. It is important to note that after Step 3I, electrical access to both the first electrode 14, and the second electrode 16, is made via respective connections through the top cladding 64. An alternate sequence of process steps is possible in which the deposition and patterning of upper layer 60 could be performed prior to laying it down over SRN film 54.

Figure 4:
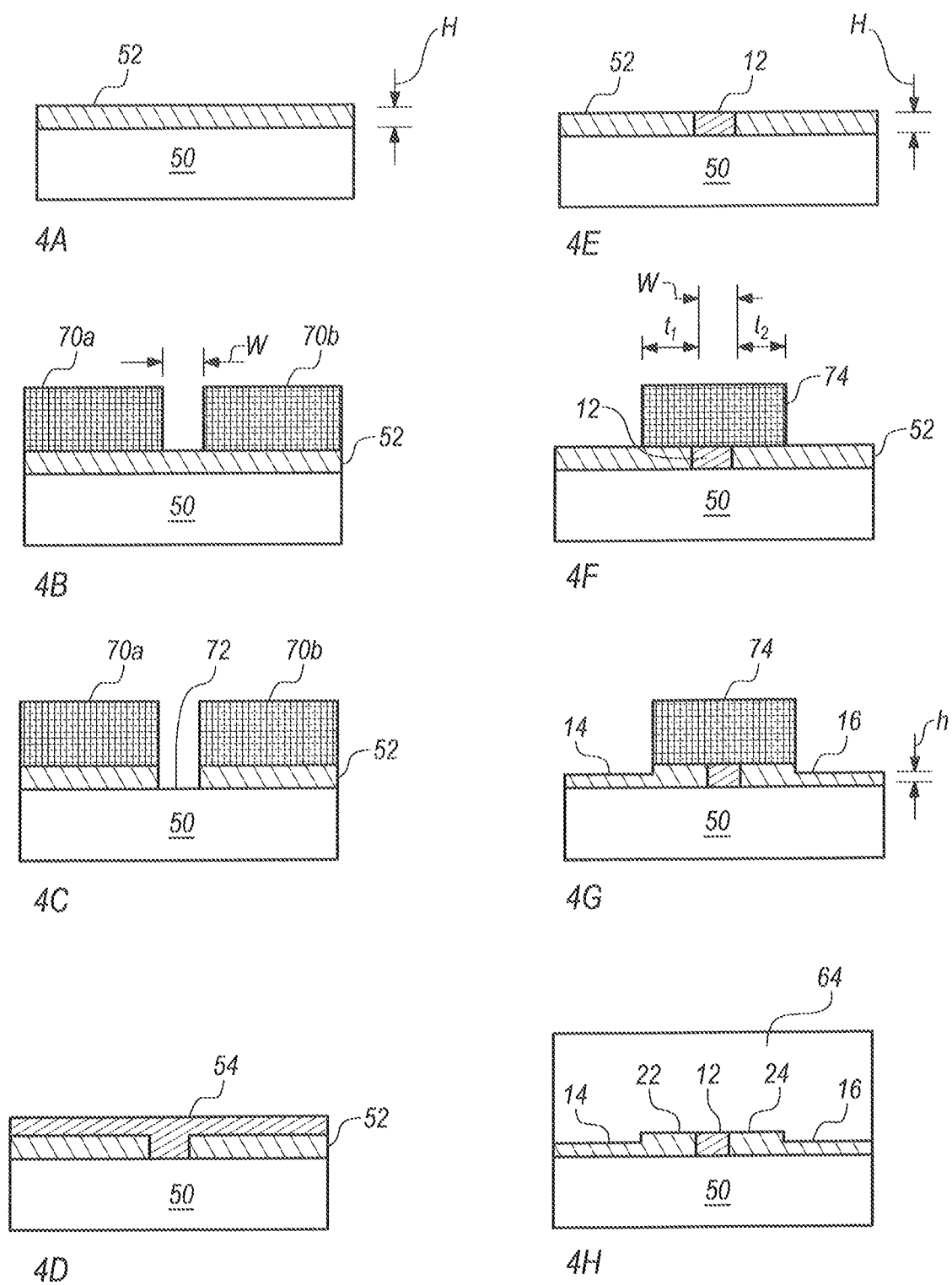
FIG. 4 is a sequence of steps 4A-H to be followed for the manufacture of the horizontal EO phase shifter shown in FIG. 2.

In FIG. 4, the process steps for manufacturing a horizontal EO phase shifter 20 such as the one shown in FIG. 2, are presented. As before with regard to the vertical EO phase shifter 10, the manufacturing steps for the horizontal EO phase shifter 20 comply with standard silicon fabrication process flows. Note: similar reference numbers are used in all Figs. for both the vertical EO phase shifter 10, and the horizontal EO phase shifter 20, where the same materials are used for similar components.

In Step 4A, the fabrication of a horizontal EO phase shifter 20 starts with a bottom cladding 50 that is covered with a lower layer 52 of doped silicon having a thickness H. Step 4B shows that an etching mask 70 with an opening of width W is positioned on the lower layer 52. Step 4C then shows that the portion of lower layer 52, which is exposed in the opening, is removed by etching until the bottom cladding 50 has been exposed to create a gap 72.

Step 4D, shows that after the etching masks 70a and 70b have been removed, an SRN film 54 is deposited across the entire lower layer 52. At this time, the gap 72 is also filled with SRN material. In Step 4E, the SRN film 54 is thinned and planarized until the lower layer 52 is exposed, while the portion of SRN film 54 that becomes the waveguide core 12 remains in the gap 72.

Step 4F shows that an etching mask 74 is positioned over the waveguide core 12, and adjacent portions of the lower layer 52. As shown, the mask 74 extends over the waveguide core 12 and portions of the lower layer 52 through a distance equal to $t_1+W+t_2$. The portions of lower layer 52 that are outside the mask 74 are then etched to establish etched portions with a thickness h. As indicated in Step 4G, this etching effectively creates the first electrode 14 and the second electrode 16. After the mask 74 is removed, a cladding 64 is deposited, similar to cladding 50. Step 4H shows a completed horizontal EO phase shifter 20 with its integrated components: a first electrode 14, a first side section 22, the waveguide core 12, a second side section 24 and a second electrode 16 with a top cladding 64.

While the particular Dielectric Electro-Optic Phase Shifter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An electro-optic phase shifter which comprises:
a waveguide core made of a Silicon-Rich Silicon Nitride (SRN), wherein the waveguide core has an index of refraction n, defines a longitudinal axis, and has a phase shifting length L and a relative permittivity $\varepsilon_r$, and wherein the index of refraction n is in a range between 2.5 and 3.5 for an operational wavelength λ for the optical wave in a range between 800 and 1,600 nm;
a first electrode positioned in intimate contact with the waveguide core;
a second electrode positioned in intimate contact with the waveguide core, wherein the waveguide core is positioned between the first and second electrodes, and the first and second electrodes have a distance therebetween; and
a driving circuit connected between the first and second electrodes to selectively establish an applied electric field E in the waveguide core, wherein the index of refraction n in the waveguide core is modulated by the applied electric field E in accordance with the quadratic electro-optic effect, mathematically expressed as $$\Delta n = 3 \frac{\chi^{(3)} E^2}{2n} D,$$

wherein $\chi^{(3)}$ is the third order nonlinear susceptibility of SRN for shifting the phase of an optical wave as the optical wave travels axially through the phase shifting length L of the waveguide core of the electro-optic phase shifter, wherein the first and second electrodes each have an index of refraction no greater than n of the waveguide core, and wherein the optical wave is guided in the fundamental mode, with a polarization to confine the optical wave within the waveguide core as it transits through the phase shifter.

2. The phase shifter of claim 1 wherein the first and second electrodes are each made of silicon.

3. The phase shifter of claim 2 wherein the first and second electrodes are selected from the group consisting of N-doped silicon and P-doped silicon, and wherein the silicon is selected from the group consisting of crystalline silicon, polycrystalline silicon and amorphous silicon.

4. The phase shifter of claim 1 wherein the first and second electrodes are made of metal.

5. The phase shifter of claim 1 wherein the relative permittivity $\varepsilon_r$ of the SRN is less than 10.

6. The phase shifter of claim 5 wherein E is an electric field selected from the group consisting of a time varying electric field and a static electric field.

7. The phase shifter of claim 5 wherein the index of refraction n allows for a very high confinement factor for the optical wave in the waveguide core and the relative permittivity $\varepsilon_r$ of SRN allows for a lower capacitance of the phase shifter.

8. The phase shifter of claim 1 wherein the phase shifting length L required for a π phase shift of the optical wave is less than 2 mm.

9. The phase shifter of claim 1 wherein the polarization of the optical wave is established perpendicular to respective interface surfaces between the waveguide core and the first electrode, and between the waveguide core and the second electrode.

10. A method for manufacturing an electro-optic (EO) phase shifter which comprises the steps of:
creating a waveguide core, wherein the waveguide core is made of a Silicon-Rich Silicon Nitride (SRN) material with a thickness H, a width W and a phase shifting length L, and a relative permittivity $\varepsilon_r$, wherein the waveguide core has an index of refraction n in a range 2.5-3.5 for an operational wavelength λ of an optical wave in a range between 800 and 1,600 nm and wherein the index of refraction n in the waveguide core is modulated by the applied electric field E in accordance with a quadratic electro-optic effect mathematically expressed as $\Delta n = 3\chi^{(3)} E^2 D/2n$, wherein $\chi^{(3)}$ is the third order nonlinear susceptibility of the SRN material, connecting a first electrode in intimate contact with the waveguide core;

connecting a second electrode in intimate contact with the waveguide core; and interconnecting a driving circuit between the first electrode and the second electrode to establish an electric field E in the waveguide core for modulating an optical wave with a phase shift as the optical wave transits through the length L of the waveguide core and wherein the optical wave is in its fundamental mode and is polarized to confine the optical wave within the waveguide core as it transits through the phase shifter.

11. The method of claim 10 wherein the relative permittivity $\varepsilon_r$ of the SRN material is less than 10.

12. The method of claim 10 wherein the phase shifting length L required for a $\pi$ phase shift of the optical wave is less than 2.2 mm.

13. The method of claim 10 wherein the first and second electrodes are selected from the group consisting of N-doped silicon and P-doped silicon, and wherein the silicon is selected from the group consisting of crystalline silicon, polycrystalline silicon and amorphous silicon.

14. The method of claim 10 wherein the first electrode is connected to the waveguide core at a first location and the second electrode is connected to the waveguide core at a second location, and wherein the first location is distanced from the second location by the thickness H to establish the EO phase shifter as a vertical EO phase shifter.

15. The method of claim 10 wherein the first electrode is connected to the waveguide core at a first location and the second electrode is connected to the waveguide core at a second location, and wherein the first location is at the width W from the second location to establish the EO phase shifter as a horizontal EO phase shifter.

16. The method of claim 10 wherein E is an externally applied time varying electric field.

17. The method of claim 10 wherein the connecting steps are accomplished using a fabrication process selected from the group consisting of depositing, growing and bonding.

* * * * *

UNITED STATES PATENT AND TRADEMARK OFFICE
CERTIFICATE OF CORRECTION

PATENT NO. : 10,895,764 B1
APPLICATION NO. : 16/663110
DATED : January 19, 2021
INVENTOR(S) : Rajat Sharma, Chen-Kuo Sun and Robert B. Welstand Page 1 of 1

It is certified that error appears in the above-identified patent and that said Letters Patent is hereby corrected as shown below:

In the Specification

Column 3, Line 2 - after the word "a" and before the word "phase" DELETE "n" and INSERT -- $\pi$ --.

Column 3, Line 43 - after the word "susceptibility" and before the word "within" DELETE "$\chi^{(3)} \sim 9\times10^{-9}$ m$^2$/V$^2$" and INSERT -- $\chi^{(3)} \sim 9\times10^{-19}$ m$^2$/V$^2$ --.

In the Claims

Column 8, Line 21 - Claim 1: after the word "refraction" and before the word "greater" DELETE "no" and INSERT -- $n_e$ --.

Signed and Sealed this
Fourth Day of May, 2021

Drew Hirshfeld
*Performing the Functions and Duties of the
Under Secretary of Commerce for Intellectual Property and
Director of the United States Patent and Trademark Office*